(12) United States Patent
Slezak

(10) Patent No.: US 12,049,174 B2
(45) Date of Patent: Jul. 30, 2024

(54) SUBASSEMBLY FOR A HOLDING TANK WITH INTEGRATED LEAK FREE INTERFACE TO THE HOLDING TANK

(71) Applicant: Thetford BV, Etten-Leur (NL)

(72) Inventor: Tijs Slezak, Breda (NL)

(73) Assignee: Thetford BV, Etten-Leur (NL)

( * ) Notice: Subject to any disclaimer, the term of this patent is extended or adjusted under 35 U.S.C. 154(b) by 28 days.

(21) Appl. No.: 18/007,596

(22) PCT Filed: Jun. 24, 2021

(86) PCT No.: PCT/US2021/038827
§ 371 (c)(1),
(2) Date: Dec. 1, 2022

(87) PCT Pub. No.: WO2021/262937
PCT Pub. Date: Dec. 30, 2021

(65) Prior Publication Data
US 2023/0303015 A1 Sep. 28, 2023

Related U.S. Application Data

(60) Provisional application No. 63/043,285, filed on Jun. 24, 2020.

(51) Int. Cl.
*B60R 15/04* (2006.01)
(52) U.S. Cl.
CPC .................... *B60R 15/04* (2013.01)
(58) Field of Classification Search
CPC ................ B60R 15/04; B60R 15/00
(Continued)

(56) References Cited

U.S. PATENT DOCUMENTS 2,449,442 A * 9/1948 Agra .................. E03D 5/00
4/433
3,239,849 A * 3/1966 Liljendahl ............ E03D 3/12
4/300
(Continued)

FOREIGN PATENT DOCUMENTS

| EP | 3611054 A1 * | 2/2020 | ............ B60R 15/00 |
| FR | 2858283 A1 | 2/2005 | |
| WO | 2021262937 A1 | 12/2021 | |

OTHER PUBLICATIONS

International Search Report and Written Opinion regarding International Application No. PCT/US2021/038827, mailed Nov. 8, 2021, ISA: EP.
(Continued)

*Primary Examiner* — Lori L Baker
(74) *Attorney, Agent, or Firm* — Harness, Dickey & Pierce, P.L.C.; Stephen T. Olson

(57) ABSTRACT

A subassembly (200) for a holding tank (202) in combination with a holding tank (202). The subassembly (200) includes a bucket shaped part (206), a seal (214), and a pump arrangement (32). The bucket shaped part (206) defines an inner cavity (212) plus an outer wall (208) and extends through an aperture on the top of the holding tank (202). The seal (214) is disposed at a top portion of the bucket shaped part (206) and enables a leak free seal between the outer wall (208) of the bucket shaped part (206) and the holding tank (202). The pump arrangement (32) is located at a lowest portion of the bucket shaped part (206).

20 Claims, 10 Drawing Sheets

(58) Field of Classification Search
USPC .............................................. 4/321, 300, 315
See application file for complete search history.

(56) References Cited

U.S. PATENT DOCUMENTS

| | | | |
|---|---|---|---|
| 5,566,401 A * | 10/1996 | Kishi | ...................... E03D 9/005 |
| | | | 4/300 |
| 2003/0080055 A1 | 5/2003 | Gross | |
| 2006/0085900 A1 | 4/2006 | Sigler et al. | |
| 2018/0354432 A1 | 12/2018 | Van Beek et al. | |
| 2021/0078509 A1* | 3/2021 | Van Beek | ................. E03D 9/10 |

OTHER PUBLICATIONS

International Preliminary Report on Patentability regarding International Application No. PCT/US2021/038827, mailed Jan. 5, 2023.
Australian Office Action regarding Patent Application No. 2021296871, mailed Dec. 21, 2023.

* cited by examiner

US 12,049,174 B2

SUBASSEMBLY FOR A HOLDING TANK WITH INTEGRATED LEAK FREE INTERFACE TO THE HOLDING TANK

CROSS REFERENCE TO RELATED APPLICATION

This application is a U.S. National Phase Application under 35 U.S.C. 371 of International Application No. PCT/US2021/038827, filed 24 Jun. 2021, which claims priority to U.S. Patent Application No. 63/043,285 filed 24 Jun. 2020. The entire disclosures of the above applications are herein expressly incorporated by reference.

FIELD

The present disclosure generally relates to holding tanks for recreational vehicles and caravans, for example. More particularly, the present disclosure relates to a subassembly for a holding tank adapted to cooperate with the holding tank at a leak free interface. The present disclosure also more particularly relates to a holding tank with such a subassembly.

BACKGROUND

The statements in this section merely provide background information related to the present disclosure and may not constitute prior art.

Commonly assigned U.S. Ser. No. 15/968,132 is directed to a wastewater management system for a recreational vehicle (RV) or caravan. The wastewater management system may include a "black water" tank for holding semi-solid human waste, a "grey water" tank for holding wastewater from sinks and showers, and a "flush water" tank, for example. The wastewater management system of U.S. Ser. No. 15/968,132 may be adapted for use with boats and other vehicles.

The holding tanks of wastewater management systems, including but not limited to the system shown and described in U.S. Ser. No. 15/968,132 are generally constructed by blow molding or rotational molding, for example. It is highly desirable that pumps and other subcomponents of such holding tanks be attached to the holding tanks in a leak free manner.

While known holding tanks may have proven to be successful for their intended purposes, a continuous need for improvement remains in the pertinent art.

SUMMARY

In accordance with one particular aspect, the present teachings provide a subassembly for a holding tank in combination with a holding tank. The subassembly includes a bucket shaped part, a seal, and a pump arrangement. The bucket shaped part defines an inner cavity plus an outer wall and extends through an aperture on the top of the holding tank. The seal is disposed at a top portion of the bucket shaped part and enables a leak free seal between the outer wall of the bucket shaped part and the holding tank. The pump arrangement is located at a lowest portion of the bucket shaped part.

With regard to another particular aspect, the present teachings provide a holding tank for a wastewater management system. The holding tank includes an interior volume for holding fluids, an opening in the top of the holding tank, a bucket shaped part, an inflow conduit, an outflow conduit, a seal, and a pump arrangement. The bucket shaped part extends through the opening in the top of the holding tank. The inflow conduit disperses an inflow fluid to the interior volume of the holding tank. The outflow conduit expels an outflow fluid from the holding tank. The seal is disposed at a top portion of the bucket shaped part and enables a leak free seal between the outer wall of the bucket shaped part and the holding tank. The pump arrangement is located at a lowest portion of the bucket shaped part for pumping fluid out of the holding tank.

BRIEF DESCRIPTION OF THE DRAWINGS

The drawings described herein are for illustration purposes only and are not intended to limit the scope of the present disclosure in any way.

DETAILED DESCRIPTION

Figure 1:
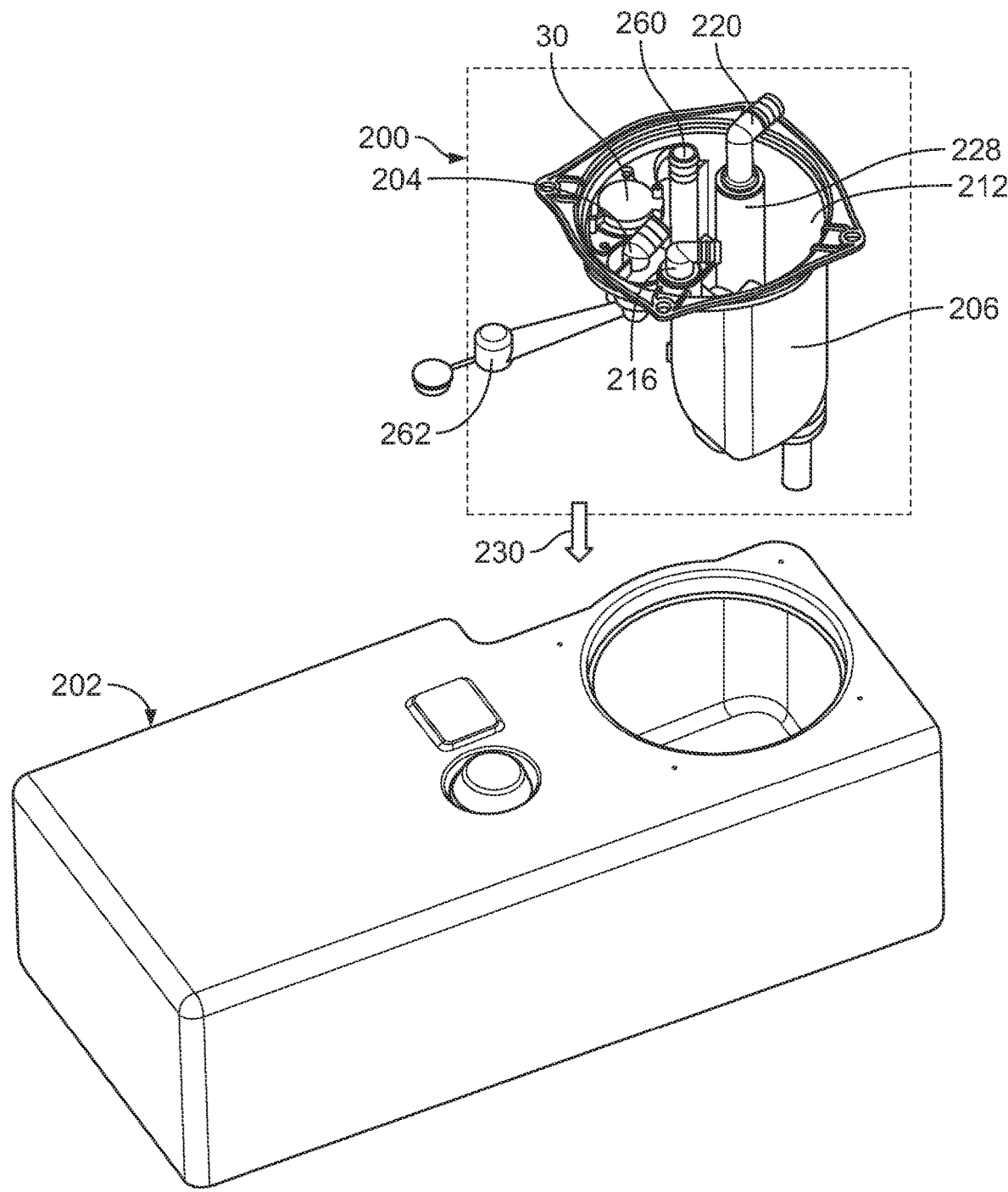
FIG. 1 is a partially exploded view of a holding tank assembly including a subassembly with a leak free interface to the holding tank in accordance with the present teachings.
Figure 2:
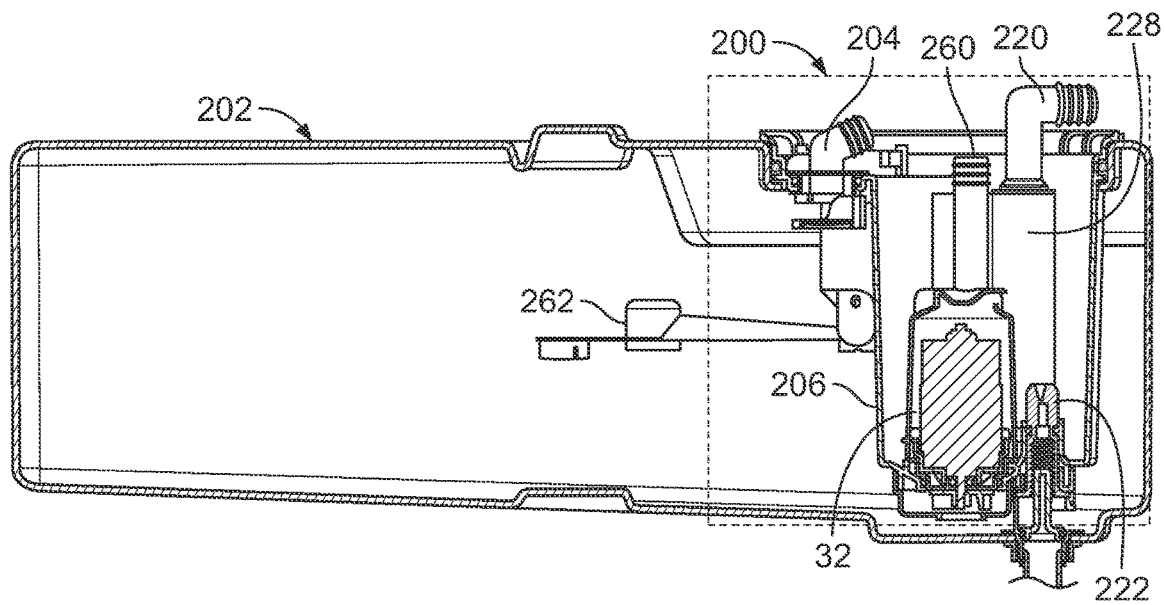
FIG. 2 is cross-sectional view over a long side of the holding tank, the subassembly shown assembled and integrated within the holding tank.

The following description is merely exemplary in nature and is not intended to limit the present disclosure, application, or uses. It should be understood that throughout the drawings, corresponding reference numerals indicate like or corresponding parts and features.

Referring generally to the drawings, a subassembly for a holding tank adapted to provide a leak free interface with the holding tank in accordance with the present teachings is illustrated and generally identified at reference character 200. An exemplary holding tank is illustrated and generally identified at reference character 202.

Before addressing the details of the subassembly 200 of the present teachings, an understanding as to an exemplary use environment is warranted. With reference to the high-level block diagram of FIG. 11, the subassembly 200 may be used with holding tanks 12, 14, 16 of a wastewater management system 10 such as that shown and described in commonly assigned U.S. Ser. No. 15/968,132, for example. When an RV equipped with a wastewater management system such as the system 10 begins a trip, the fresh water tank 16 may be substantially or completely full. The black water tank 12 and the grey water tank 14 may be substantially or completely empty. The system 10 may include level sensors 30, illustrated as 30A, 30B, and 30C in FIG. 11, for sensing the liquid level in the holding tanks 12, 14, and 16, with various pumps 32 for pumping liquid out of the various holding tanks and various valves for directing the flow of liquid through the various conduits. Furthermore, the system 10 includes a control unit 36 for controlling the management of and liquid flows of wastewater within the system 10 and for emptying of the wastewater tanks 18 and 20, among other functions.

Kitchen wastewater 18 from a kitchen sink, for example, and bathroom wastewater 20 may be collected and stored in the grey water tank 14. The grey water in the grey water tank 14 may be used for flushing of the toilet 22 in response to a user request for flushing. This grey flush water is delivered to a filter 62 through a conduit 64. The filter 62 filters solids from the grey water to create a visually acceptable toilet flush water for the user. Filtered grey flush water is delivered to the toilet 22 for flushing through a conduit 65.

The solids collected by the filter 62 may be periodically transported to the black water tank 12 through a conduit 66. The filter 62 also enables a grey water mixing cycle through grey water mixing nozzle 80 to more evenly distribute grey water and additives from the additive subsystem 54 to treat the grey water and at the same time flushes the filter medium of the filter 62 clean. In this regard, a further conduit 69 extends from the filter 62 to the grey water tank 14.

A hose or conduit 72 may extend between the black water tank 12 and the sewage system. The conduit 72 may be associated with a valve 26 and a pump 32. The valve 26 of the black water holding tank 12 may have a closed mixing loop through black water mix conduit 71 and a black water mixing nozzle 82. Mixing of the black water is preferred to avoid sediments of black water in the tank.

The black water tank 12 and the grey water tank 14 may be periodically emptied. Such emptying of the black water tank 12 may be desired when the black water tank 12 has reached capacity or when an RV trip has been completed, for example. In response to user input, the controller 38 may operate to open the valve 26 associated with the conduit 72 providing fluid communication between the black water and the sewage system. After the black water tank 12 is emptied, the grey water pump 32 on conduit 64 will pump grey water into the black water tank 12 via a cleaning spray nozzle 204 to rinse the walls of the black water tank 12 and empty the grey water tank 14. The grey water will then travel from the black water tank 12 to the sewage system through conduit 72.

Figure 11:
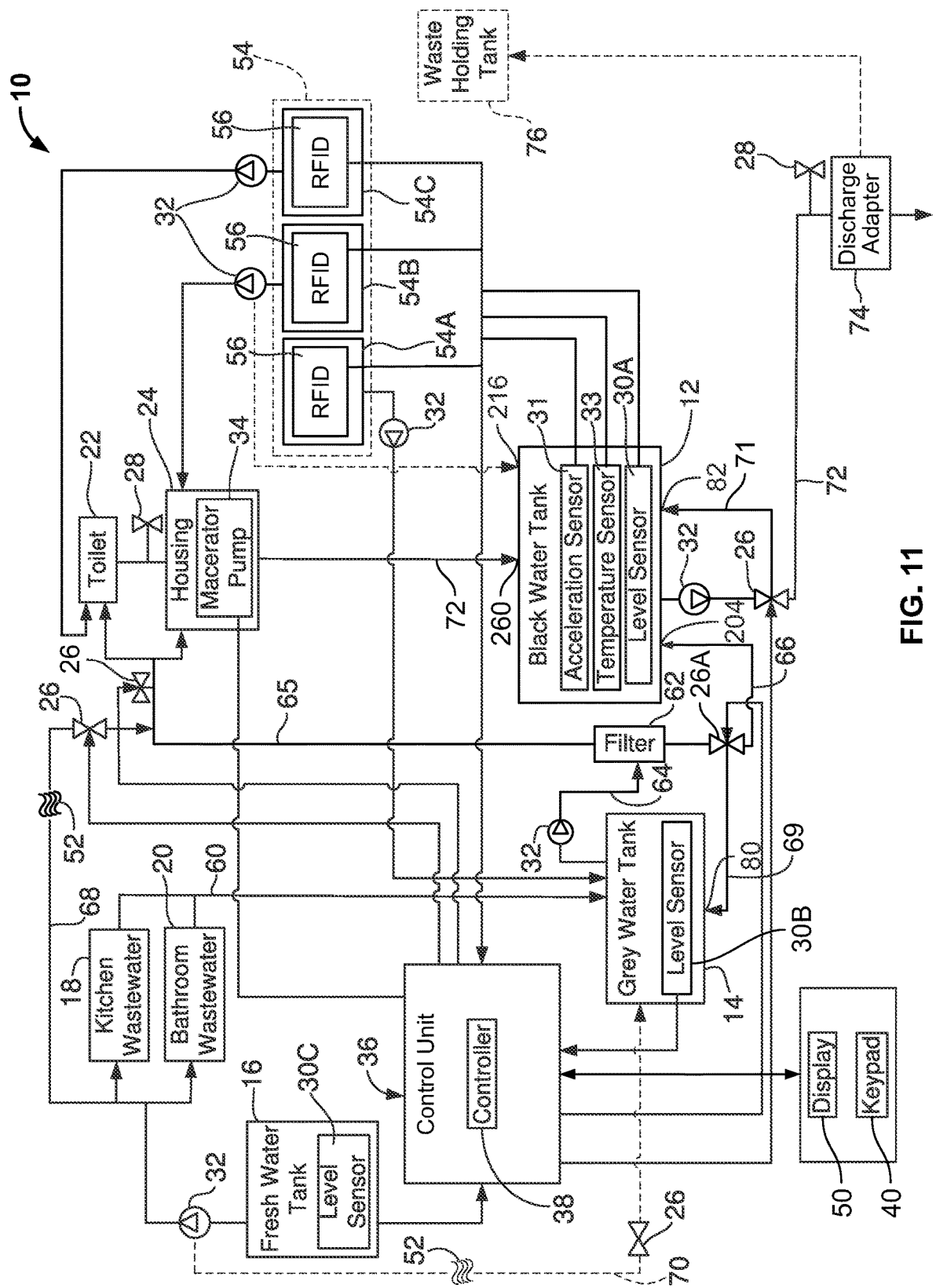
FIG. 11 is a high-level block diagram of an exemplary system incorporating one or more holding tanks having the subassembly with a leak free interface to the holding tank of the present teachings.

Another example of a RV wastewater management is more generic and can be much simpler. A RV wastewater management system shall generally include a first holding structure defined by a black water holding tank 12, a second holding structure defined by a fresh water holding tank 16, and optionally a third holding structure defined by a grey water holding tank 14. Furthermore, the RV wastewater management system may include manually or electrically operated valves, conduits for transporting various fluids, and pumps or drains to empty holding tanks. A subassembly 200 may be included in such an exemplary RV wastewater system. The subassembly 200 is generally attached to a holding tank 202, where the holding tank 202 may be a black water tank 12 such as depicted in FIG. 11, for example.

Figure 6:
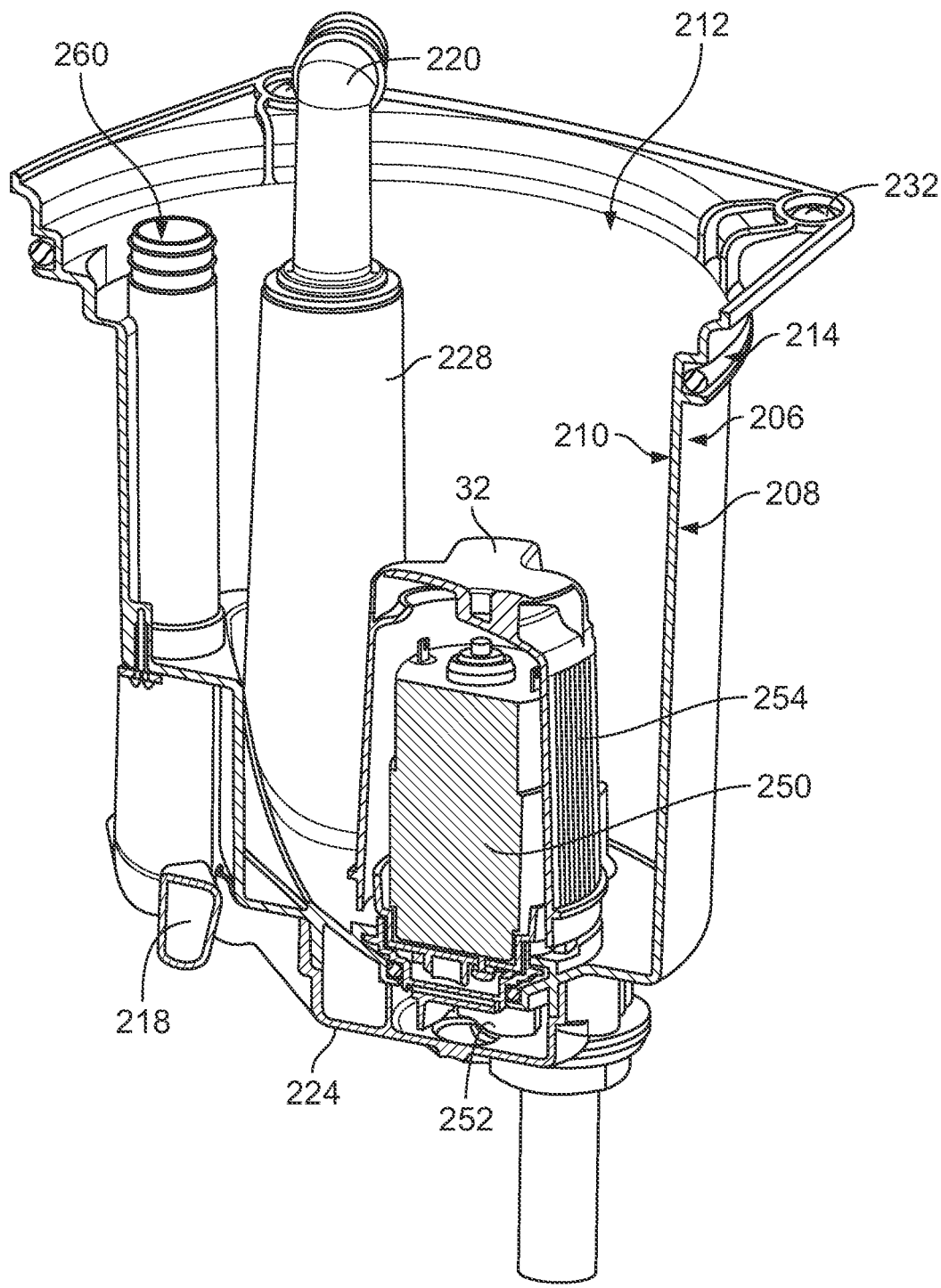
FIG. 6 is a cross-sectional view over a long side of the subassembly of the present teachings.

Further describing the subassembly 200 in combination with the holding tank 202 and with particular regard to FIG. 6 and FIG. 1, the subassembly 200 may generally include a general bucket shaped part 206 having an outer wall 208 and an inner wall 210 defining a cavity 212 with an open top, a seal 214 positioned at the top portion of the bucket shaped part 206 around the open top of the cavity 212, and one or more openings allowing for connections with other holding tank related components, such as a pump 32, a level sensor 30, an additive nozzle 216, a cleaning spray nozzle 204, a primary inlet nozzle 218, an outlet nozzle 220, a drain 222, and a pump cup 224. This list will be understood to be inexhaustive as the subassembly 200 may more generally only include a subset of these components and may provide interfaces for additional components not listed here.

Figure 3:
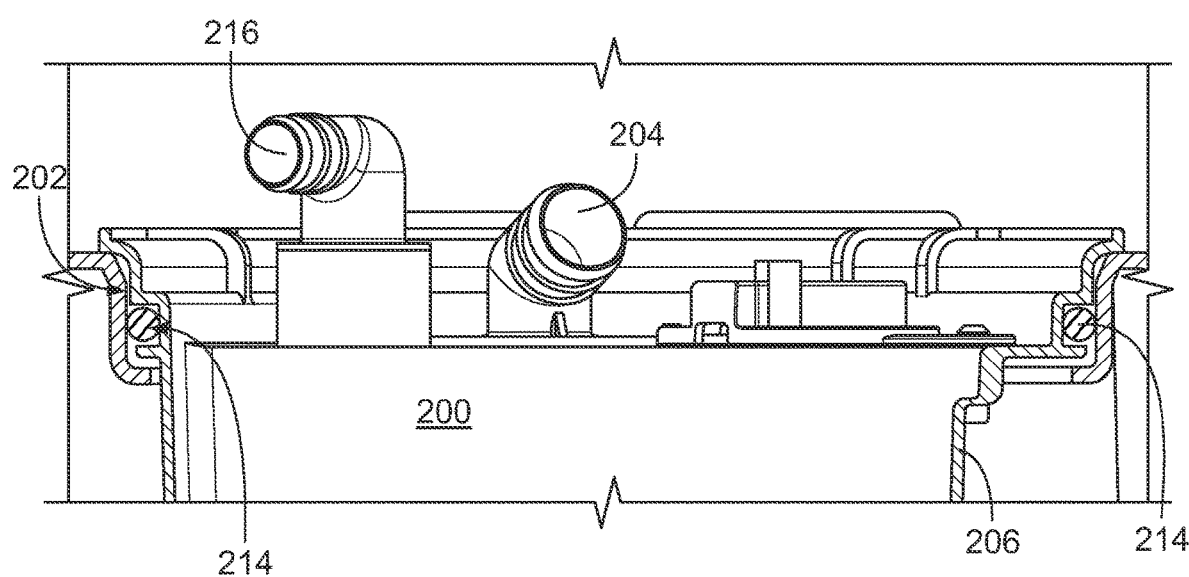
FIG. 3 is an enlarged cross-sectional view further illustrating a top portion and a seal of the subassembly defining the leak free interface with the tank interface of the present teachings in the assembled position.

The seal 214 provides a leak free interface between the subassembly 200 and the holding tank 202 in order to contain fluid in the holding tank 202. The seal 214 may preferably be made of an elastic polymer, which could be manufactured in the form of an o-ring as illustrated in FIG. 3 and FIG. 6. The leak free interface prevents fluid from leaking out of the holding tank 202 both from overfill and from sloshing of the fluid inside the holding tank 202. Sloshing could be induced by vibrations or sudden changes in velocity and/or acceleration due to driving conditions while transiting in an RV, for example. Leakage of fluid from the holding tanks is generally known to be unfavorable, malodorous, and often damaging to other systems of the RV.

It will be further generally understood that the holding tanks, such as the holding tank 202 generally shown in the figures, of a RV wastewater management system have a large number of connections and interfaces on each holding tank structure in order to properly distribute the various wastewater system fluids. Manufacturing and assembly difficulties often arise with conventional wastewater holding tank designs that have a multitude of openings due to the need to assemble all the components separately in a production line on the holding tank structure, as these holding tanks have in general a large volume (may be 200 L or more). It is therefore desirable to improve production efficiency by preassembling parts and components on a much smaller general interface part, such as the subassembly 200 described by the present teachings. The volume of the subassembly 200 of the present teachings may be about 5 L, for example, such that is much easier and more efficient to connect the subassembly 200 with other wastewater system componentry on a production line than if working with a holding tank 202 on the same production line. Therefore, the advantageously smaller sized subassembly 200 can function as an intermediary interface part between the necessary wastewater componentry with their numerous interfaces and the holding tank 202.

The subassembly 200 presents additional manufacturing benefits by minimizing tooling steps during production. Wastewater holding tanks are generally made out of plastic and are produced by blow molding or rotational molding. Blow molding and rotational molding are not particularly well suited for integration of connections as they generally need one or more secondary production steps for opening the holes, making threads, and for smooth finishing, for examples. With conventional technology, it is therefore desirable to minimize the number of tank connections to correspondingly minimize the number of secondary production steps. For conventional holding tanks there may be at least 8-10 parts that need to be mounted on the holding tank structure via several distinct connections. The subassembly 200 of the present teachings has one single connection to the holding tank 202 which significantly limits the needed production steps.

Holding tanks made by blow molding or rotational molding often have high dimensional tolerances which create the risk of leakage between the holding tank and the mounted component. Each opening on the holding tank creates a possible leak path and therefore it is desirable to minimize the number of openings to prevent possible leakage from the connection points. Factors such as high operational temperatures, long lifetime, and heavy vibration due to driving increase the risks of wastewater leakage. Pumps and associated outgoing conduits are generally positioned at the lowest point in holding tanks to enable complete emptying of the tank upon discharging. That connection between the pump and the holding tank, but also other connections between the holding tank and other subcomponents, is known in the field to be of high leakage risk. When a leakage at the lowest point in the holding tank occurs, a potentially full holding tank of roughly 200 L wastewater can leak empty into a vehicle. That leakage effect can cause irreparable damage to an RV.

The present teachings provide an arrangement that keeps the pump 32 and outflow conduit 228 positioned at the lowest point in the holding tank 202, in order to completely empty a tank upon discharge, while positioning the seal 214 between the holding tank 202 and the subassembly 200 at the highest point in the holding tank 202. In case of wastewater leakage between subassembly 200 and the pump 32 or the outflow conduit 228, the wastewater inside the holding tank 202 will leak to the inside cavity 212 of the bucket shaped part 206. As the seal 214 is at the highest portion of the bucket shaped part 202 (see FIG. 3 in particular), the wastewater can never leak to the outside of the wastewater assembly of the holding tank 202 and subassembly 200. Ergo, the present teachings prevent the RV from suffering irreparable damage due to wastewater leakage.

Figure 4:
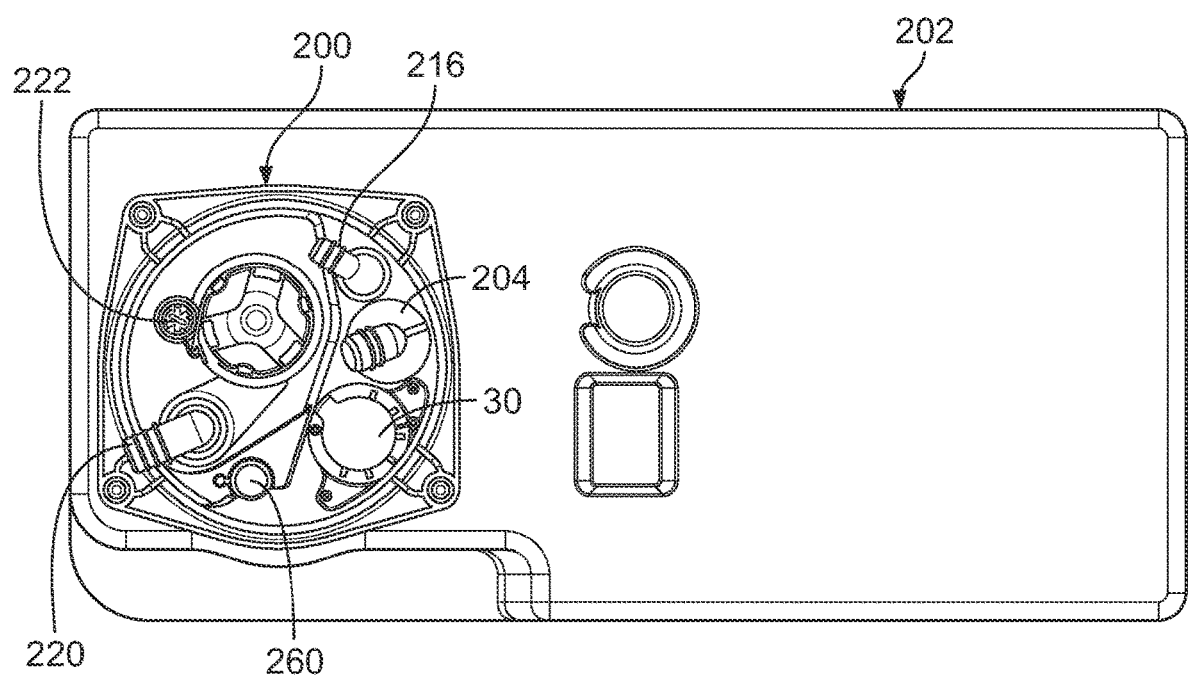
FIG. 4 is a top view of a holding tank assembly incorporating the subassembly of the present teachings.

Service to any of the holding tank assembly components due to damage or loss of functionality is very common in the RV industry and has in most cases to be executed by a trained service engineer. Associated service costs are therefore high and it is preferred that holding tank assemblies are designed for easy servicing. As these holding tank assemblies are generally positioned underneath the RV floor, the holding tanks and all its sub-components are difficult to access. In most cases there is a hatch in the floor to be able to access the holding tank assembly from the top. Still, the components are not mounted in the vertical direction, but mostly in a horizontal direction and that makes it especially difficult to service. In some cases the holding tank is still filled with wastewater which makes it even more inconvenient. All these reasons lead to increased labor hours associated with servicing. The present teachings provide a significant improvement with respect to serviceability. The subassembly 200 is assembled in the vertical direction along the subassembly installation direction arrow 230 in FIG. 1 and can be taken out completely as a unit in case of any malfunction. The subassembly 200 is shown fully installed into the holding tank 202 from the top in FIG. 4. Even if the holding tank is still filled with wastewater, removal of the subassembly 200 is still possible as the wastewater will have no path to escape outside the holding tank 202. The subassembly 200 is sealed to the holding tank 202 with the single, large seal 214 and several screws 232 that are mounted in the vertical direction.

Figure 10:
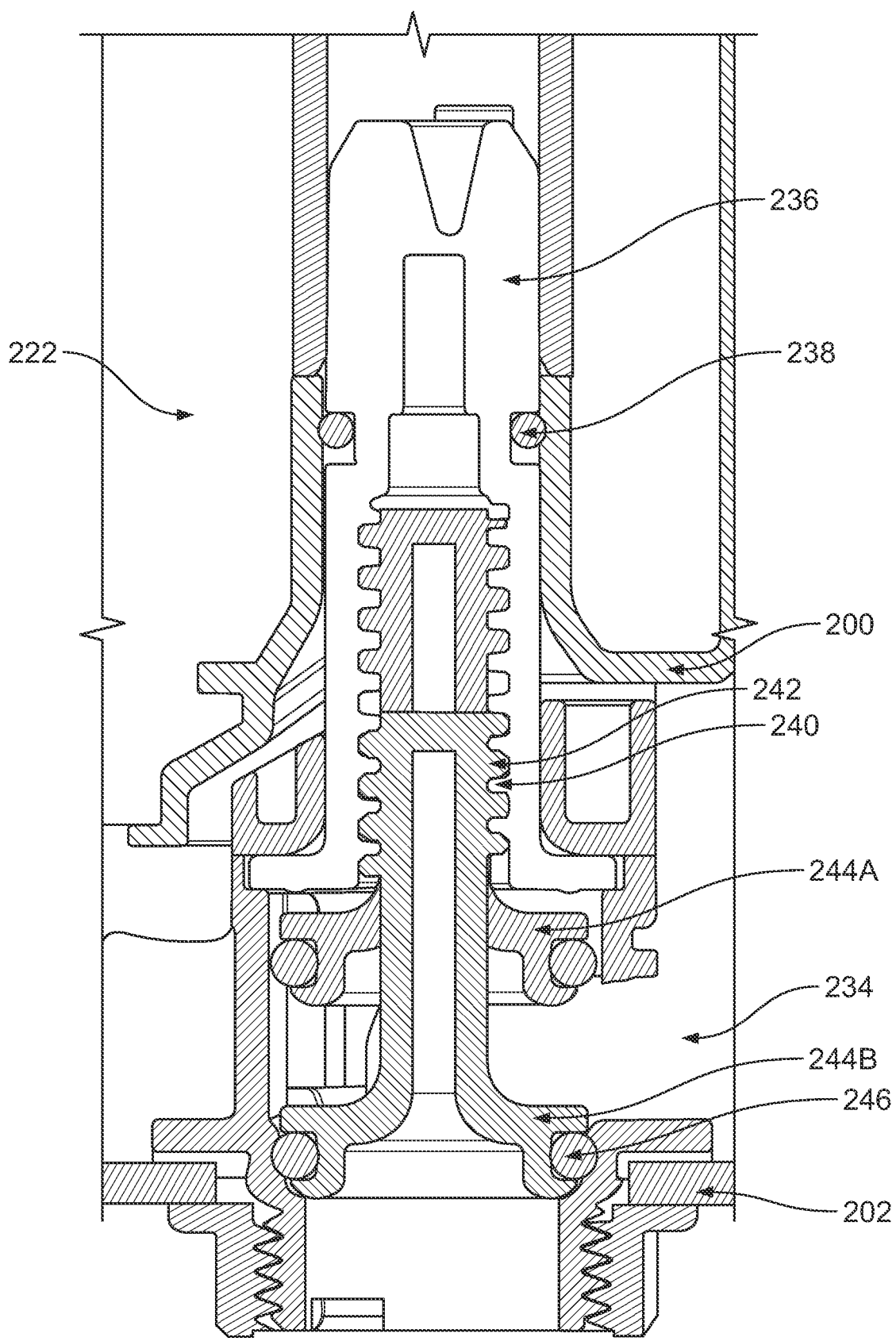
FIG. 10 is a cross-sectional view subassembly of FIG. 8 illustrating a manual emergency drain.

In case of emergency, or before long term storage, it may be desirable to drain the various holding tanks of the RV completely. Current holding tanks known in the field have a manually operable valve on the outside of the holding tank. Opening that valve can be a dirty job to do as waste is flowing out of the tank immediately. As illustrated in FIG. 10, the subassembly 200 of the present teachings has a manual drain 222 that opens a drain path 234 on the outside of the holding tank 202. The drain is operable from the inside of the subassembly 200 by rotating the drain knob 236. The drain knob is sealed to the bucket shaped part 206 by radial seal 238, which may be an o-ring. The drain knob 236 is equipped with screw internal screw thread 240 that corresponds with the external screw thread 242 of the drain piston 244. The drain piston is equipped with a drain seal 246 that seals between the drain piston 244 and the drain path 234. Rotating the drain knob 236 clockwise or counterclockwise forces the piston 232 in a vertical direction to move between an open position 244A and a closed position 244B. In closed position 244B, the emergency drain 222 is shut off to the holding tank 202.

Figure 7:
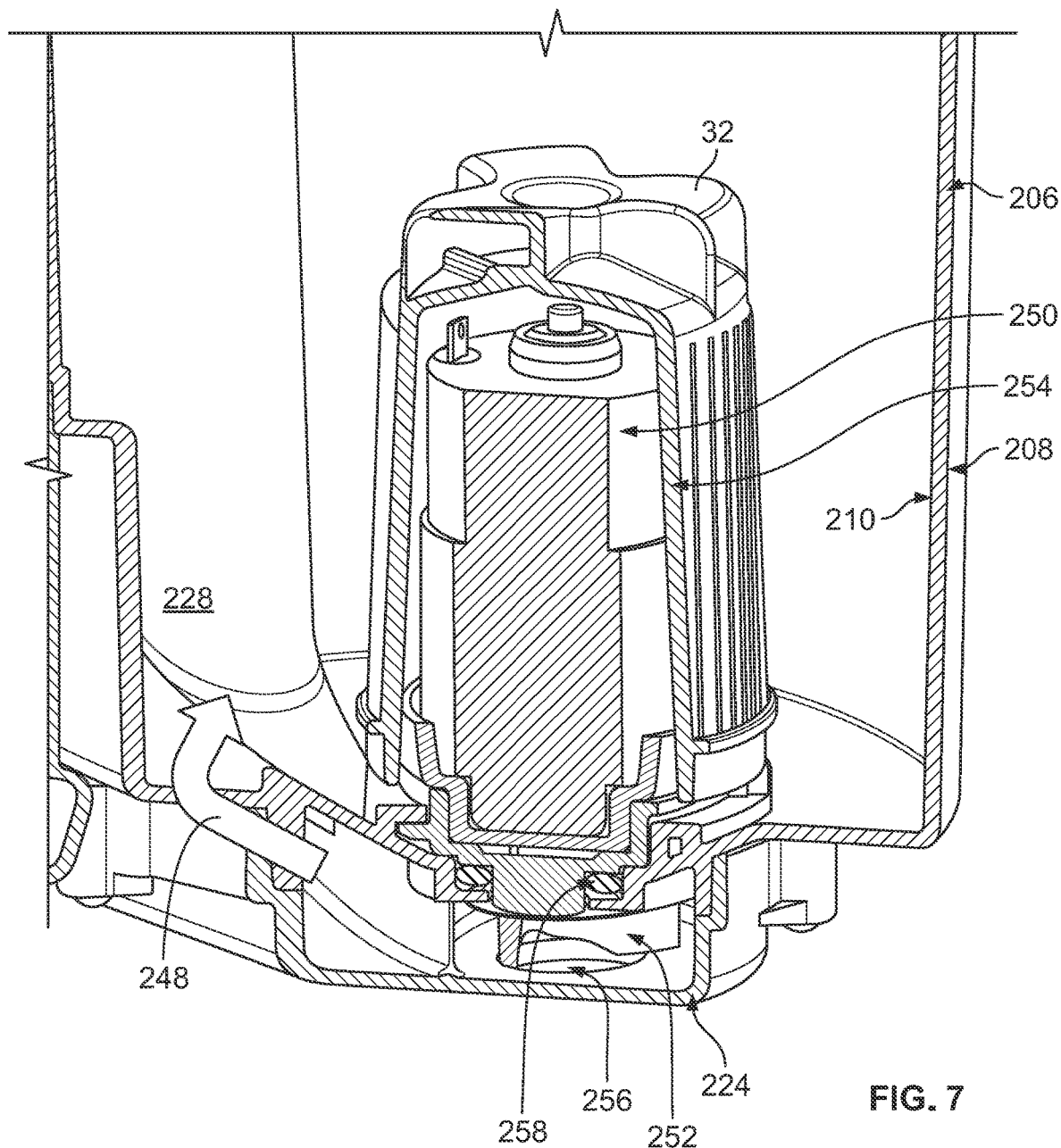
FIG. 7 is another cross-sectional view of the subassembly of the present teachings which details a pump arrangement.
Figure 8:
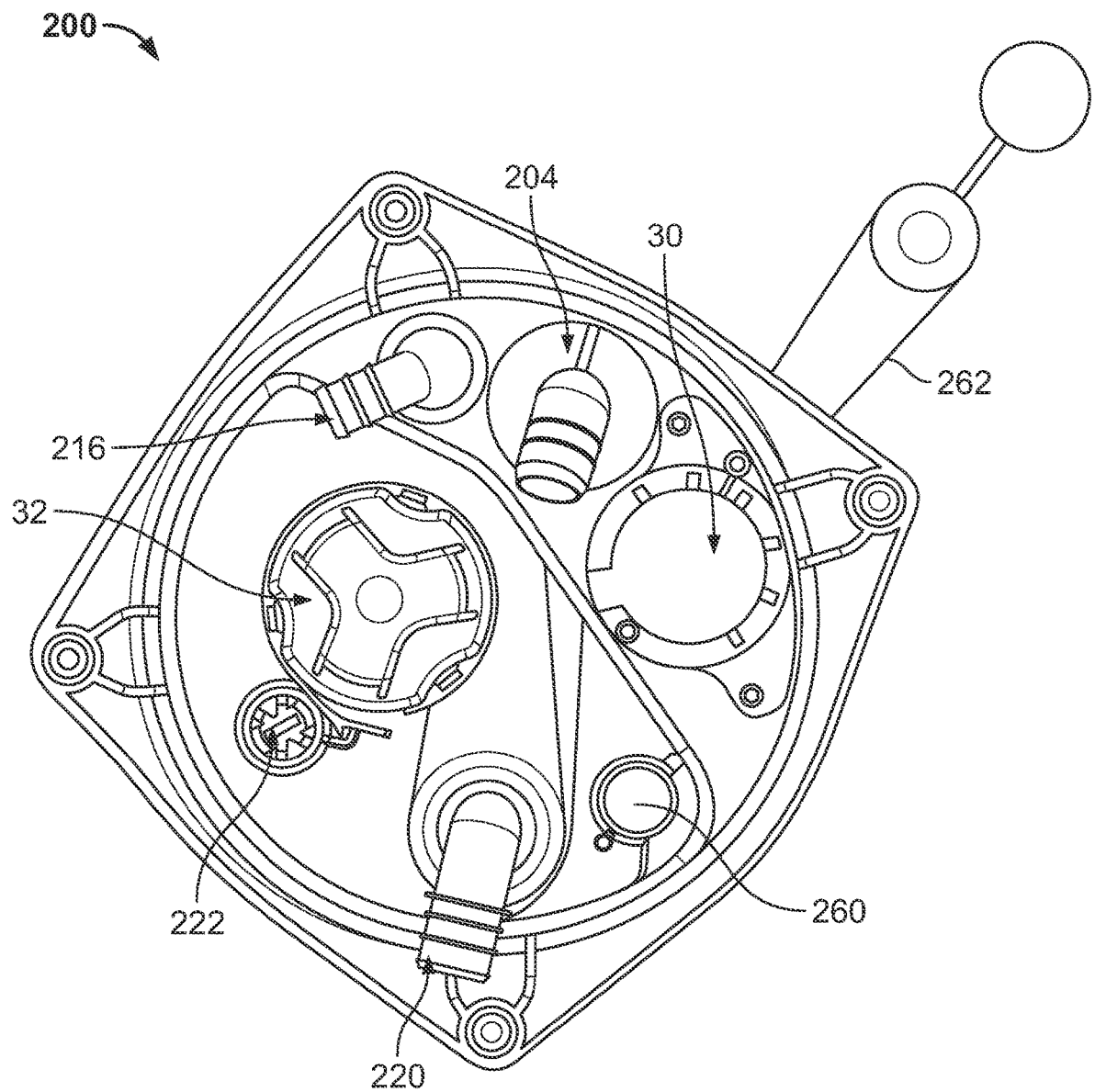
FIG. 8 is a top view of the subassembly of the present teachings.

Pumps used in wastewater management systems for RV's can be centrifugal pumps, membrane pumps, impellor pumps, for example. In this particular embodiment of the invention a centrifugal pump is shown, but other pump types are not excluded from the present teachings. In conventional waste holding tank assemblies, the pump is connected with the holding tank volume through a short conduit. Another advantage of the leak free integrated holding tank interface as shown in this embodiment is the integration of the pump 32 and outflow conduit 228 into the bucket shaped part 206 which is particularly depicted in the cross-sectional view of FIG. 7. The illustrative outflow arrow 248 demonstrates the direction of outflow fluid driven by the motor 32 up through the outflow conduit 228. The pump 32 has an arrangement which includes a motor 250 for driving a rotor 252, a motor housing 254 for protecting the motor, the rotor 252 for creating the movement of the liquid, a pump cup 224, for guiding the moving liquid from pump inlet 256 to the outflow conduit 228 and a pump seal 258. The integration of these functions in the bucket shaped part 206 leads to a reduction of materials, required parts, and build-in space. It also eliminates the use of separate coupling parts which are known for narrowing the flow diameter and thus reducing the pump efficiency.

Wastewater management systems such as system 10, but also simplified versions have greatly varying holding tank sizes. As the tanks are positioned underneath the vehicle floor, the shape of the holding tanks are very much depending on the chassis and layout of the RV. Different layouts generally mean different tank shapes. The leak free interface of the subassembly 200 of the present teachings provides one integrated total solution for all subcomponents that can be easily installed in any type of tank shape. Furthermore, the bucket shaped part 202 as generally illustrated in the figures is designed in such a way that the same part can be used for both the black water tank 12 and the grey water tank 14 of system 10. This leads to an increased efficiency in both engineering as well as manufacturing different RV layouts. It will be generally understood that the holding tank 202 could have a different shape in alternative embodiments and still reside within the scope of the present teachings.

Figure 5:
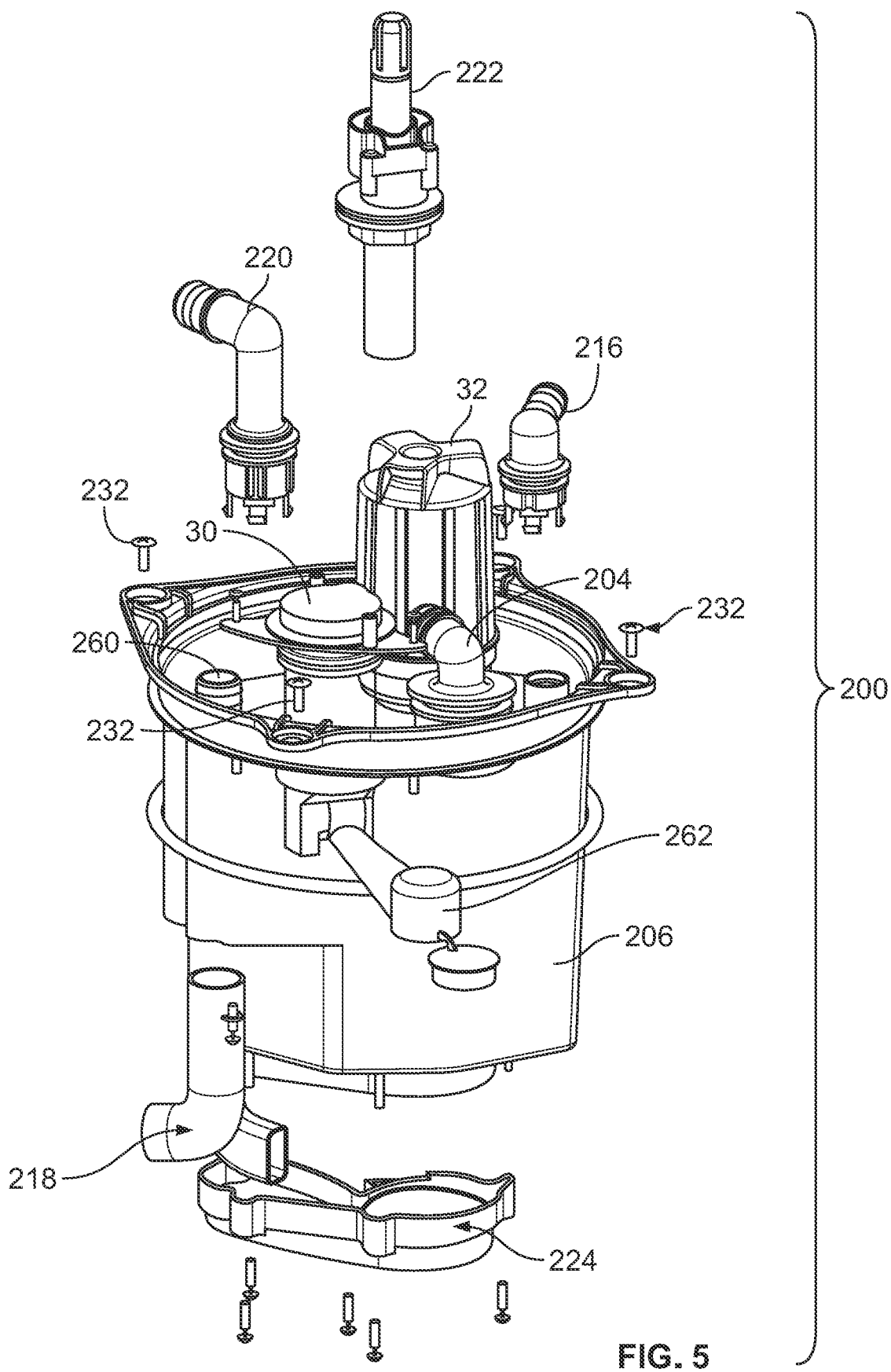
FIG. 5 is an exploded view of the subassembly of the present teachings.

The subassembly 200 and its various openings will now be further described with particular reference to FIG. 5 and its general interfaces with the wastewater management system 10 of FIG. 11. The subassembly 200 has three different fluid inlets and one fluid outlet. The first fluid inlet is the primary inflow conduit 260, which receives black water from the toilet 22 via conduit 72 of the wastewater management system 10 and then disperses the black water into the holding tank 202 via the primary inlet nozzle 218. The second fluid inlet is the cleaning spray nozzle 204, which receives grey water from the gray water tank 14 via conduit 66 and sprays the grey water around the interior walls of the holding tank 202. The third fluid inlet is the optional additive nozzle 216, which receives an additive from the additive subsystem 54 via a pump 32 (depicted as a dashed, optional, line in FIG. 11) for treating the black water inside the black water tank. The one fluid outlet is the outlet nozzle 216, which receives outflowing fluid from the pump arrangement 32 via outflow conduit 228. It will be understood that the subassembly 200 may be used in other wastewater management systems other than that the exemplary wastewater management system 10. For examples of variations, the type of fluid, style of nozzle, and orientation of the conduits may differ in other wastewater management systems or with regard to different holding tanks within a wastewater management system.

The subassembly 200 is generally made of plastic, such as injection molded plastic. In order to further improve manufacturing and reduce the number of parts in the system, parts of the subassembly 200 may be molded as a unitary body. As generally depicted in the figures, the bucket shaped part 206, primary inflow conduit 260, and outflow conduit 228 are preferably formed as a unitary plastic molding.

Further describing the subassembly 200, the subassembly may include a level sensor 30 which may be attached to a float arm 262 for sensing the level of fluid in the holding tank 202. The level sensor 30 may thus relay the fluid level to the control unit for being displayed on the display 50 to aid an operator in planning when to drain the holding tank 202. In traditional holding tanks the float arm and level senor required a separate interface with the tank, but the subassembly 200 allows for streamlined manufacturing and removes the need for a separate interface for the level sensor 30.

Figure 9:
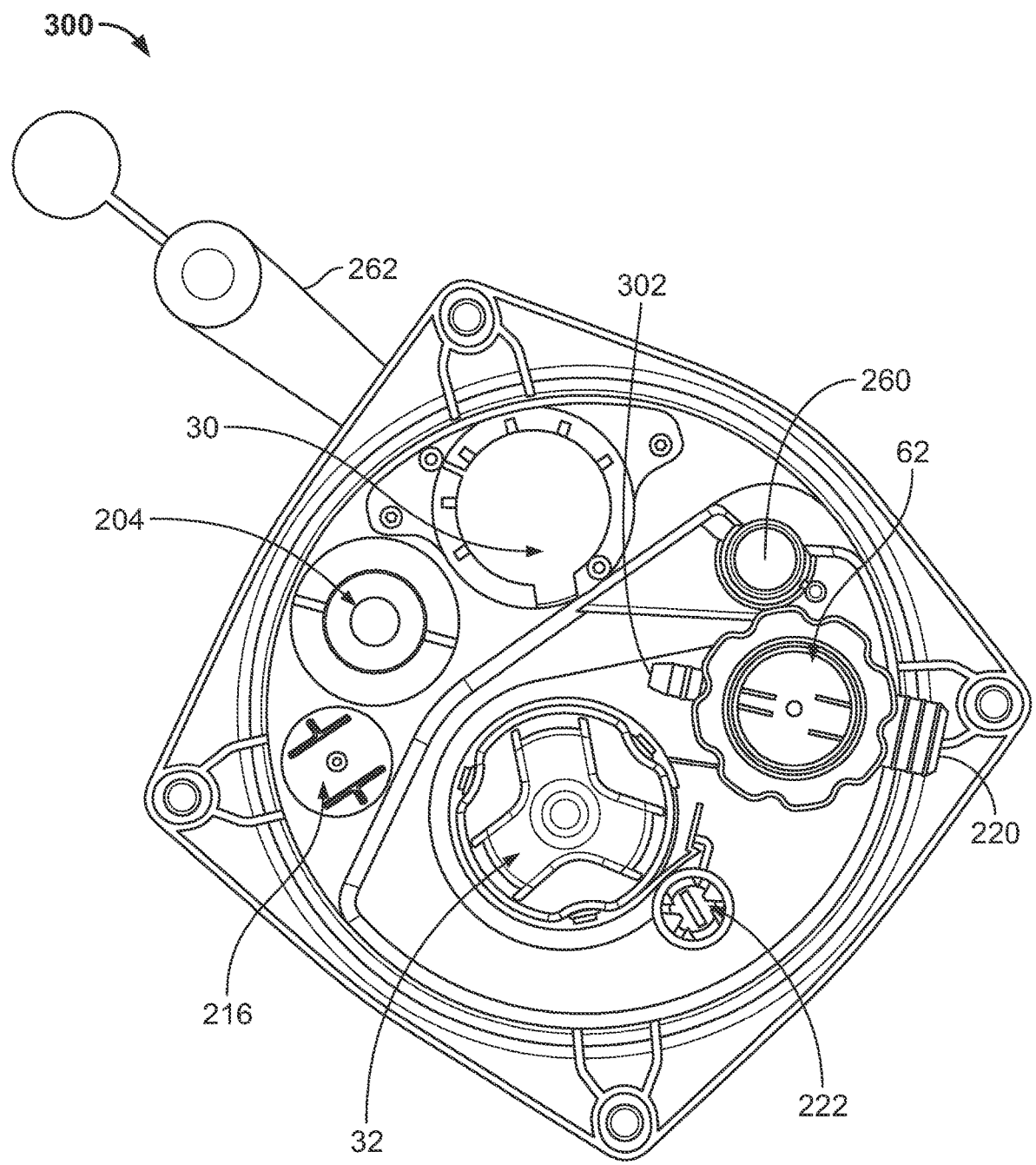
FIG. 9 is a top view of another version of a subassembly with a leak free interface between the subassembly and a holding tank in accordance with present teachings.

Turning to FIG. 9, a variation of the subassembly 200 is illustrated and referred to generally as subassembly 300. Given the similarities between the subassembly 200 and the subassembly 300, like reference characters are used to identify like elements. Subassembly 300 primarily differs from subassembly 200 by incorporating a filter 62 on the end of the outflow conduit 228 for filtering solids out of the outflow fluid from holding tank 202. The filter 62 of subassembly 300 has two outlets, outlet nozzle 220 and a smaller secondary outlet nozzle 302 for diverting filtered fluid. Subassembly 300 also differs in that the inlet fluid nozzles do not have a hose barb fitting as they are depicted as having in subassembly 200. Subassembly 300 can therefore support different attachments than subassembly 200 for conduits carrying fluid in and out of the subassembly 300. Subassembly 300 is an exemplary alternative embodiment of the present teachings.

Accordingly, it will now be appreciated that the present teachings provide a subassembly 200 for the wastewater management system 10, where the subassembly 200 includes many interfaces and connections to the holding tank structures 12, 14, and 16. Each holding tank may be equipped with all or a subset of level sensor 30, primary inlet nozzle 218, cleaning spray nozzle 204, additive nozzle 216, pump 32, filter 62, and an emergency drain 208, for examples. In traditional holding tanks all the parts and components are mounted individually on the holding tank structure resulting in inefficient production, high leakage risk, high leakage impact, and difficult servicing. The leak free integrated holding tank interface brings solutions to all these problems that occur in traditional holding tanks.

While specific details have been described, those skilled in the art will recognize that various modifications or variations may be made without departing from the scope of the present disclosure. The one or more examples provided herein simply illustrate the various embodiments and are not intended to limit the present disclosure. While the subassembly 200 has been described particularly for a wastewater management system, it will be appreciated that the present teachings may be readily adapted for other applications. The description and any claims should be interpreted liberally with only such limitation as is necessary in view of the pertinent prior art.

What is claimed is:

1. A holding tank subassembly in combination with a holding tank, the holding tank subassembly comprising:
   a bucket shaped part extending through an aperture in a top of the holding tank and filling a partial interior volume of the holding tank, the bucket shaped part having an outer wall defining an inner cavity;
   a seal at a top portion of the bucket shaped part providing a leak free interface between the outer wall of the bucket shaped part and the aperture of the holding tank; and
   a pump arrangement disposed in the inner cavity of the holding tank and located on a bottom portion of the inner cavity of the bucket shaped part.

2. The holding tank subassembly in combination with the holding according to claim 1, wherein the seal is made of an elastic polymer.

3. The holding tank subassembly according to claim 2, wherein the seal is an o-ring.

4. The holding tank subassembly according to claim 1, wherein the outer wall of the bucket shaped part has an inflow opening for an inflow fluid to enter the holding tank and an outflow opening for an outflow fluid exiting the holding tank.

5. The holding tank subassembly according to claim 4, wherein the subassembly further includes an outflow conduit located in the bucket shaped part with a first end of the outflow conduit configured to receive an outflow fluid pumped by the pump arrangement from the outflow opening, and a second end of the outflow conduit for expelling the outflow fluid from the subassembly.

6. The holding tank subassembly according to claim 5, wherein the subassembly further includes an inflow conduit located in the bucket shaped part with a first end of the inflow conduit attached to the inflow opening of the bucket shaped part and configured to disperse an inflow fluid to the interior volume of the holding tank, and a second end of the inflow conduit which receives the inflow fluid from outside of the subassembly.

7. The holding tank subassembly according to claim 6, wherein the second end of the inflow conduit and the second end of the outflow conduit are within the inner cavity of the bucket shaped part.

8. The holding tank subassembly according to claim 6, wherein the bucket shaped part further includes a connection to an emergency drain, the connection operable from an inside of the bucket shaped part.

9. The holding tank subassembly according to claim 8, wherein the connection is a threaded stud rotatable to an open position for draining fluid.

10. The holding tank subassembly according to claim 6, wherein the bucket shaped part is made of an injection molded polymer.

11. The holding tank subassembly according to claim 10, wherein the bucket shaped part, the outflow conduit, and the inflow conduit are manufactured as a unitary plastic molding.

12. The holding tank subassembly according to claim 6, wherein the subassembly further includes a cleaning nozzle for spraying a second inflow fluid over an inner wall of the holding tank.

13. The holding tank subassembly according to claim 12, wherein the subassembly further includes a mixing nozzle for dispersing a third inflow fluid into the holding tank.

14. The holding tank subassembly according to claim 13, wherein the second inflow fluid is a grey water fluid and the third inflow fluid is a water treatment additive fluid.

15. The holding tank subassembly according to claim 12, further comprising a float arm, the outer wall of the bucket shaped part having a hole connecting a float arm for sensing a liquid level in the holding tank.

16. The holding tank subassembly according to claim 15, wherein the float arm is connected to a level sensor which informs a control unit as to the level of the liquid in the holding tank, the level sensor located in the inner cavity of the bucket shaped part.

17. The holding tank subassembly according to claim 6, wherein the subassembly further includes a filter for filtering out solids in the outflow fluid from the holding tank.

18. The holding tank subassembly according to claim 6, the pump arrangement including a pump for pumping fluid from the holding tank and a pump cup basin for channeling water from the pump to the outflow conduit.

19. A holding tank for a wastewater management system, the holding tank comprising:
    an interior volume for primarily holding fluids;
    an aperture in the top of the holding tank;
    a bucket shaped part extending through the aperture in the top of the holding tank and filling a partial interior volume of the holding tank, the bucket shaped part defining an inner cavity and an outer wall;
    an inflow conduit for dispersing an inflow fluid to the interior volume of the holding tank,
    an outflow conduit for expelling an outflow fluid from the holding tank,
    a seal at a top portion of the bucket shaped part providing a leak free interface between the outer wall of the bucket shaped part and the aperture of the holding tank; and
    a pump arrangement located on a bottom portion of the inner cavity of the bucket shaped part for pumping fluid out of the holding tank.

20. A holding tank according to claim 19, wherein the bucket shaped part, the outflow conduit, and the inflow conduit are manufactured as a unitary plastic molding.

* * * * *